(12) United States Patent
Demharter

(10) Patent No.: US 7,080,205 B2
(45) Date of Patent: Jul. 18, 2006

(54) ARRANGEMENT AND METHOD FOR REDUCING THE PROCESSING TIME OF A DATA PROCESSING DEVICE

(75) Inventor: Nikolaus Demharter, Dormitz (DE)

(73) Assignee: Fujitsu Siemens Computer GmbH, Munich (DE)

(*) Notice: Subject to any disclaimer, the term of this patent is extended or adjusted under 35 U.S.C. 154(b) by 17 days.

(21) Appl. No.: 10/204,421

(22) PCT Filed: Mar. 20, 2001

(86) PCT No.: PCT/DE01/01067

§ 371 (c)(1),
(2), (4) Date: Sep. 27, 2002

(87) PCT Pub. No.: WO01/73552

PCT Pub. Date: Oct. 4, 2001

(65) Prior Publication Data

US 2003/0126364 A1    Jul. 3, 2003

(30) Foreign Application Priority Data

Mar. 29, 2000   (DE) ................................ 100 15 693

(51) Int. Cl.
*G06F 12/00*   (2006.01)
(52) U.S. Cl. ................. 711/119; 711/103; 711/129
(58) Field of Classification Search .................. 713/2; 711/119, 129, 103, 153
See application file for complete search history.

(56) References Cited

U.S. PATENT DOCUMENTS

| | | | | |
|---|---|---|---|---|
| 5,632,026 A | * | 5/1997 | Chuang | 711/163 |
| 5,909,224 A | * | 6/1999 | Fung | 345/531 |
| 5,999,476 A | * | 12/1999 | Dutton et al. | 365/230.01 |
| 6,003,129 A | | 12/1999 | Song et al. | |
| 6,189,070 B1 | * | 2/2001 | See et al. | 711/103 |
| 6,260,114 B1 | * | 7/2001 | Schug | 711/129 |
| 6,272,587 B1 | * | 8/2001 | Irons | 711/103 |
| 6,282,644 B1 | * | 8/2001 | Ko | 713/2 |
| 6,691,224 B1 | * | 2/2004 | Yeh et al. | 713/2 |

FOREIGN PATENT DOCUMENTS

| | | |
|---|---|---|
| DE | 197 35 870 A1 | 6/1996 |
| JP | 08-305634 | 11/1996 |
| WO | PCT/US97/16765 | 3/1998 |

OTHER PUBLICATIONS

Web Page of Sunplus: www.sunplus.com.tw/products/memory/spr.asp, 2003 Copyright Sunplus Technology Co., Ltd.

* cited by examiner

*Primary Examiner*—Nasser Moazzami
(74) *Attorney, Agent, or Firm*—Cohen, Pontani, Lieberman & Pavane

(57) ABSTRACT

The invention herein pertains to a data processing device (1) with a processor (2) and a memory (3). The memory (3) comprises a first memory sector (4) and a second memory sector (6), a first cache (5) being arrayed for the first memory sector (4) and a second cache (7) being arrayed for the second memory sector (6). It is the function of the second cache (7) that predetermined and selected sub-programs, interrupt vectors (8) and interrupt handlers (9), which are normally stored in the second memory sector (6), which is, for example, a ROM memory or a RAM memory, are saved in temporary storage in the second cache (7). It is an advantage that no displacement cycles take place in the second cache (7).

10 Claims, 1 Drawing Sheet

Key to Numbers on Figure

1  Data processing device
2  Processor
3  Memory
4  first memory sector
5  first cache
6  second memory sector
7  second cache
8  interrupt vectors
9  interrupt handlers

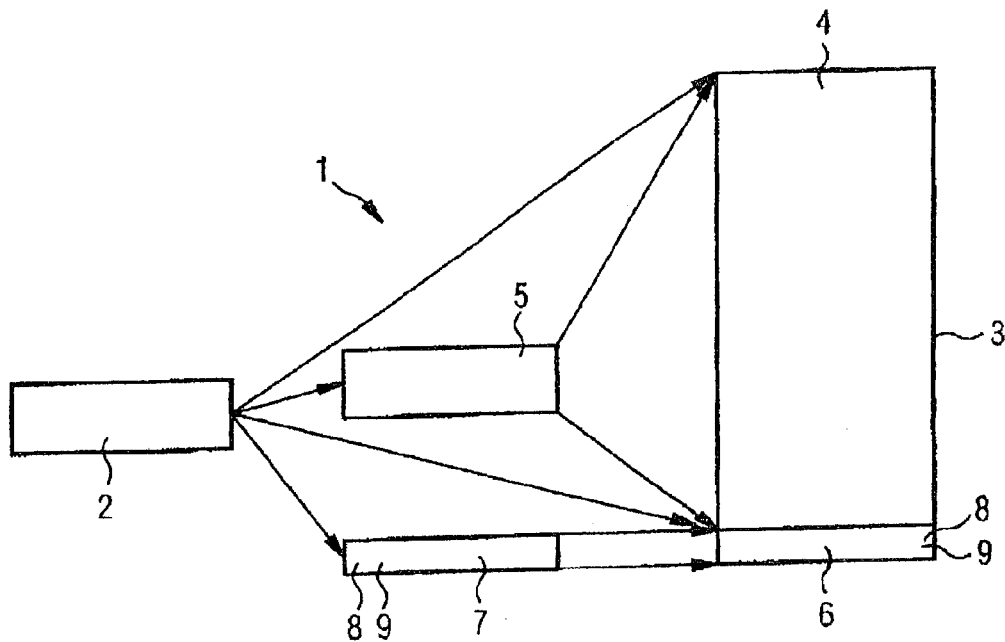
Key to Numbers on Figure
1     Data processing device
2     Processor
3     Memory
4     first memory sector
5     first cache
6     second memory sector
7     second cache
8     interrupt vectors
9     interrupt handlers

ARRANGEMENT AND METHOD FOR REDUCING THE PROCESSING TIME OF A DATA PROCESSING DEVICE This is a U.S. national stage of application No. PCT/DE01/01067, filed on Mar. 20, 2001.

FIELD OF THE INVENTION

This application pertains to an array and a process suitable for reducing the processing time of a data processing device.

BACKGROUND OF THE INVENTION

Data processing devices are used to process data and to control, organize and analyze input and output signals. During operation of a data processing device, which usually comprises a processor and a memory, interrupts, so called, will occur. These are signals which indicate an event to the processor. An example of such events may be conditions, results or events generated both within the processor or the CPU (Central Processing Unit) and outside of the CPU, and which require execution of a specific routine in reaction to the event. The specific routine is the interrupt routine, whose start address is located at a given memory address of the memory as an interrupt vector, so called. In addition, interrupt handlers, so called, are in use; they are small program segments which are executed upon occurrence of an interrupt in order, for example, to determine the source of the interrupt.

Since interrupt vectors have to be available as well during cold start or warm start of a data processing device, they are saved in a non-temporary memory sector, such as a ROM (Read Only Memory). However, a ROM has the disadvantage of requiring a very long access time, a fact which entails significant interrupt latencies. For this reason, the suggestion is made, for example, in "ARM Training Material: Technical Training Course 1999, Chapter 16 and Chapter 19" to copy the interrupt vectors into a faster RAM (Random Access Memory) sector after starting the data processing device, and then to overlay this sector over the address sector originally occupied by the ROM. It is also mentioned in connection with this process that the RAM sector is mapped on the place of the original ROM sector. This process makes it possible to cut the interrupt latency approximately in half.

SUMMARY OF THE INVENTION

It is the purpose of the invention to state an array and a process which further reduce the processing time of a data processing device.

In accordance with the invention, the purpose is met by a data processing device comprising:
  a processor;
  a memory connected to the processor and having a first memory sector and a second memory sector;
  a first cache which images the first memory sector and places a portion of the first memory sector in temporary storage;
  a second cache which images the second memory sector and places it in temporary storage,
  wherein the second cache has the same memory capacity as the second memory sector and
  wherein the second memory sector is a RAM, a ROM, an EPROM or an EEPROM.

This array makes it possible to use two separate cache memories, of which one, for example, is suitable for storing the interrupt vectors and interrupt handlers, while the other cache is available in the conventional manner for temporary storage of the main memory. In comparison with the main memory, such a cache is a small and fast memory which places data from the large and slower main memory into temporary memory. As a rule, displacement cycles occur in the cache, as the cache is much smaller than the main memory to be saved in temporary storage. Storage of the interrupt vectors and interrupt handlers in a cache ensures significant reduction in the processing time of an interrupt.

In one embodiment of the array in the invention, an interrupt vector is to be stored in the second cache. This array makes it possible to place the entire second memory sector in temporary storage in the second cache, thus keeping the interrupt vectors ready for fast memory access.

In another embodiment of the array in the invention, an interrupt handler is to be stored in the second cache. This array makes it possible to place the entire second memory sector in temporary storage in the second cache, thus keeping the interrupt handlers ready for fast memory access.

Furthermore, the memory capacity of the first cache is to be smaller than the memory capacity of the first memory sector. This embodiment permits cost-saving use of a cache which is significantly smaller than the first memory sector. This requires, however, that displacement cycles, so called, occur in the cache, replacing no longer needed data in temporary storage in the cache with other data from main memory which are being processed in the CPU at the moment.

In a further embodiment of the invention, the processor is to be a processor from ARM corporation. This array makes it possible to use ARM's entire family of processors which, for example, comprises the ARM7 processor.

Plans call for the second memory sector to be a ROM, an EPROM or an EEPROM. This array will guarantee that interrupt vectors and interrupt handlers will be available in the second memory sector and the second cache upon cold start or warm start.

Regarding the process, the purpose is met by a process for operating a data processing device comprising the following steps:
  provision of a data processing device comprising a processor and a memory,
  wherein the memory has a first memory sector and a second memory sector;
  imaging the first memory sector onto a a first cache;
  temporarily storing a part of the first memory sector in the first cache;
  imaging the second memory sector onto a second cache;
  temporarily storing the second memory sector in the second cache,
  wherein the second cache has the same storage capacity as the second memory sector and
  wherein no displacement cycles take place in the second cache;
  selecting a program code segment stored in the second memory sector.

The process in accordance with this invention images the first memory sector onto the first cache. Since the first memory sector is designed to be larger than the first cache, only part of the first memory sector is saved in temporary storage in the first cache, and displacement cycles do take place. Thus, the data from the first memory sector are stored in the first cache, an example thereof being a program code. The interrupt vectors and the interrupt handlers, as well as specifically selected and predetermined routines, for example, are stored in the second memory sector, which is saved into temporary memory by a second cache. This process makes fast access to specific routines and values possible. The second memory sector, for example, is designed to be as large as the second cache, so that no displacement cycles take place therein.

A second process step calls for the program code segment to be a subroutine.

Furthermore, the second memory sector is to be a RAM, a ROM, an EPROM or an EEPROM.

Another process step calls for storing an interrupt vector in the second cache.

Furthermore, an interrupt handler is to be stored in the second cache.

Another advantageous procedural step calls for no displacement cycles to occur in the second cache. This process ensures that the interrupt vectors and/or interrupt handlers are kept available for the processor without time delay in the second cache.

Other advantageous embodiments of the invention are described in the various sub-claims.

Below, the invention will be explained in greater detail by means of a sample embodiment and a figure.

BRIEF DESCRIPTION OF THE DRAWING

The drawing, unnumbered, is a conceptual diagram in accordance with the teachings of the present invention.

DETAILED DESCRIPTION OF THE PRESENTLY PREFERRED EMBODIMENTS

The figure represents a data processing device 1. The data processing device I comprises a processor 2 and a memory 3. Memory 3 is divided into a first memory sector 4 and a second memory sector 6. In this sample embodiment, the first memory sector 4, which constitutes the main memory, is significantly larger than the second memory sector 6. In this instance, the second memory sector 6 is a ROM memory which keeps available operating data which, for example, are needed for a cold start or a reset. The first memory sector 4, for example, is a RAM memory which is used during operation of the data processing device 1 to store program segments and data. In this sample embodiment, the first memory segment 4 is temporarily stored in a first cache 5. The second memory sector 6 is temporarily stored in a second cache 7. In the second memory sector 6, for example, interrupt vectors 8 and interrupt handlers 9 are stored. The second cache 7 thus has the advantage of being transparent to the software running on data processing device 1 and hence requires no special programming on the part of the software developers. A cache therein is a small fast memory which saves data from the comparatively large and slow main memory in temporary storage. The fact that a separate second cache 7 is used for the interrupt vectors 8 guarantees that the interrupt vectors 8 will not be displaced by other data in the second cache 7. No displacement cycles take place, as the second cache 7 has the same storage capacity as the second memory sector 6. By contrast, displacement cycles do take place in the first cache 5 which keep copying the currently needed data from the first memory sector 4 into the first cache 5, displacing data which are no longer needed at the moment. Avoidance of displacement cycles in the second cache 7 significantly speeds up the processing time of the data processing device 1 for the stored data and routines. Examples of already realized magnitudes in the second cache 7 are 256 bytes and 1024 bytes.

A process for operating the data processing device 1 illustrated in the figure provides that predetermined and selected sub-programs, interrupt vectors 8 and interrupt handlers 9 are stored in the second memory sector 6, which is designed to be a ROM memory. During a cold start or a reset of data processing device 1, the interrupt vectors and interrupt handlers stored in the second memory sector 6 are thus available. During operation, the first memory sector 4 is saved in temporary storage by the first cache 5, and the second memory sector 6 is saved in temporary storage by the second cache 7. Whenever the processor 2 accesses the main memory, the first cache 5 or the second cache 7 are first searched for availability of the data. If so, a cache hit, so called, is achieved; if not, a cache miss occurs. A cache miss results in additional actions executed in data processing device 1, such that the data are read from main memory and sent to processor 2. This, however, requires a significantly longer period of time than a cache hit.

| Key to Numbers on FIGURE | |
|---|---|
| 1 | Data processing device |
| 2 | Processor |
| 3 | Memory |
| 4 | first memory sector |
| 5 | first cache |
| 6 | second memory sector |
| 7 | second cache |
| 8 | interrupt vectors |
| 9 | interrupt handlers |

[translator's note: the above key (= legend) has been copied onto a hard copy of the illustration and is being sent by surface mail.]

The invention claimed is:

1. A data processing device comprising:
a processor;
a memory connected to the processor and having a first memory sector and a second memory sector;
a first cache which images the first memory sector and stores a portion of the first memory sector in a temporary memory;
a second cache which images the second memory sector and stores the entire second memory sector in a second temporary memory;
wherein the second cache has the same storage capacity as the second memory sector; and
wherein the second memory sector is a RAM, a ROM, an EPROM or an EEPROM.

2. The data processing device in accordance with claim 1, wherein an interrupt vector is stored in the second cache.

3. The data processing device in accordance with claim 1, wherein an interrupt handler is stored in the second cache.

4. The data processing device in accordance with claim 1, wherein the storage capacity of the first cache is smaller than the storage capacity of the first memory sector.

5. The data processing device in accordance with claim 1, wherein the processor is a processor from ARM Corporation.

6. A data process for operation of a data processing device comprising:
providing a data processing device which comprises a processor and a memory, wherein the memory has a first memory sector and a second memory sector;

imaging the first memory sector on a first cache;
temporarily storing a portion of the first memory sector in the first cache;
imaging of the second memory sector on a second cache;
temporarily storing the entire second memory sector in the second cache;
wherein the second cache has the same storage capacity as the second memory sector;
wherein no displacement cycles take place in the second cache; and
selecting a program code segment for storage in the second memory sector.

7. The data process in accordance with claim 6, wherein the program code segment is a sub-routine.

8. The data process in accordance with claim 6, wherein the second memory sector is a RAM, ROM, an EPROM or an EEPROM.

9. The data process in accordance with claim 6, wherein an interrupt vector is stored in the second cache.

10. The data process in accordance with claim 6, wherein an interrupt handler is stored in the second cache.

* * * * *